United States Patent [19]

Bazzea

[11] 4,276,013
[45] Jun. 30, 1981

[54] TOGGLE ACTION CLOSING AND LOCKING DEVICES FOR PRESSES

[75] Inventor: Cesare Bazzea, Brescia, Italy

[73] Assignee: I.M.I. Industria Macchine Idrauliche S.p.A., Brescia, Italy

[21] Appl. No.: 42,185

[22] Filed: May 24, 1979

[30] Foreign Application Priority Data

Dec. 11, 1978 [IT] Italy .................... 69821 A/78

[51] Int. Cl.³ .................... B29F 1/00; B29C 3/00; B30B 1/16
[52] U.S. Cl. .................... 425/451.5; 425/593
[58] Field of Search ............... 425/451.5, 451.6, 592, 425/593, DIG. 220, DIG. 222, 595, 451.2

[56] References Cited

U.S. PATENT DOCUMENTS

| 2,444,123 | 6/1941 | Sebek | 425/DIG. 222 |
|---|---|---|---|
| 2,624,915 | 1/1953 | Corson | 425/593 X |
| 3,208,373 | 9/1965 | Bachelier | 425/DIG. 220 |
| 3,359,598 | 12/1967 | Bury | 425/451.6 X |
| 3,632,272 | 1/1972 | Herbener | 425/451.6 X |
| 3,667,890 | 6/1972 | Rusinini | 425/DIG. 220 |
| 3,669,599 | 6/1972 | Snider et al. | 425/451.2 X |
| 4,017,236 | 4/1977 | Penkman et al. | 425/451.2 X |

FOREIGN PATENT DOCUMENTS

| 1184463 | 12/1964 | Fed. Rep. of Germany | 425/593 |
|---|---|---|---|
| 2158659 | 6/1973 | France | 425/451.6 |

Primary Examiner—J. Howard Flint, Jr.
Attorney, Agent, or Firm—Alan H. Levine

[57] ABSTRACT

A closing and locking device for a press comprising a stationary plate, a stationary head spaced from the stationary plate, and a mobile plate movable toward and away from the stationary plate. Movement of the mobile plate is controlled by a double acting piston-cylinder mechanism. A toggle arrangement is pivotally connected between the mobile plate and the stationary head. A second double acting piston-cylinder mechanism operates, after the first piston-cylinder mechanism moves the mobile plate toward the stationary plate, to position the toggle arrangement for locking the mobile plate in place. The entire closing and locking device is arranged within the external contour of the press. The toggle arrangement plays no part in the major portion of the movement of the mobile plate with respect to the stationary plate, but is activated only to lock and unlock the mobile plate. Provision is made for slowing the flow of fluid to the first piston-cylinder device to permit degassing during compression molding of resins containing expanding agents.

3 Claims, 6 Drawing Figures

TOGGLE ACTION CLOSING AND LOCKING DEVICES FOR PRESSES

The present invention relates to an improvement in known toggle action closing and locking devices which may be used on presses whose operation is pneumatic, hydropneumatic, hydraulic, and oleodynamic, and wherein the transmission of the closing motion and force takes place through one or more lever groups with four or more articulated joints. According to the improvement, said devices may be advantageously used on horizontal, vertical or inclined presses used separately or in any way coupled to other stationary or mobil operating units.

It is known that in presses provided with an actuating system of the above-mentioned type, the closure of the die is obtained by the approach of the mobile plate to the stationary plate. The stationary plate is connected to the machine structure, and the mobile plate is generally guided by columns, through a toggle action device which controls both the approach of the mobile plate to the stationary plate and the following locking of the die closed, with the greatest force allowed by the machine.

The toggle action devices which are known are subject to constraints of kinematic, dimensional, and functional kind which will be made more clear in the following description. These constraints compel, in addition to the certain actuation features, cumbersome machine dimensions.

It is known that reducing the cumbersome dimensions of presses of the above-described type, the other features remaining the same (die opening stroke and maximum closing tonnage), is an important technical problem with horizontal type, vertical type, and otherwise oriented machines. Since a substantial part of the overall dimensions of each machine is accounted for by the closing and locking device, a reduction in the size of said device, if it is obtained without any detriment to performance, allows important economic advantages in the installation as well as greater flexibility in the use of the machine, either in the single, combined, or automated condition.

The main object of present invention is to provide an improved closing device utilizing the toggle in the locking phase, which, at the same performance characteristics as known devices (stroke and maximum force), has reduced dimensions and permits it to be arranged in the structure of the machine at a location which results in reducing the overall dimensions while improving some operating parameters.

According to the object of the invention, the device is so made that the die closing phase is effected through two successive operation modalities. In the first (approach of the mobile plate), the lever system forming the real toggle is inactive and is dragged by the mobile plate; in the second (locking), the lever system becomes active and causes the locking of the die at the maximum pressure. This allows attainment, as it will be made more evident in the following, of the above-said advantages.

With the stated objects in view the improvement according to the invention is characterized by including a closing and locking toggle action device for presses whose operation is pneumatic, hydropneumatic, hydraulic, or oleodynamic, oriented horizontal, vertical, or inclined, which may be used separately or coupled in any way with other operating or service, stationary, or mobile units. In said device, the approaching movements of the mobile plate towards the stationary plate, and the locking movements with the die closed, are engendered by two or more double action cylinders. The first cylinder is mobile and acts directly on the mobile plate in the phase of approaching the stationary plate, while the second cylinder produces, sequentially with the first, the terminal locking of the toggle formed by one or more lever groups with four or more articulated joints. The whole device is contained within the frame of the machine in order to utilize more rationally the toggle lever system and reduce its dimensions while maintaining performance (opening stroke and maximum closing force), and consequently reducing the dimensions of the press and improving its performances.

Additional features of the invention will be seen from the following description, in which reference is made to the schematic and illustrateive drawings annexed as a non-limiting example.

Figure 2:
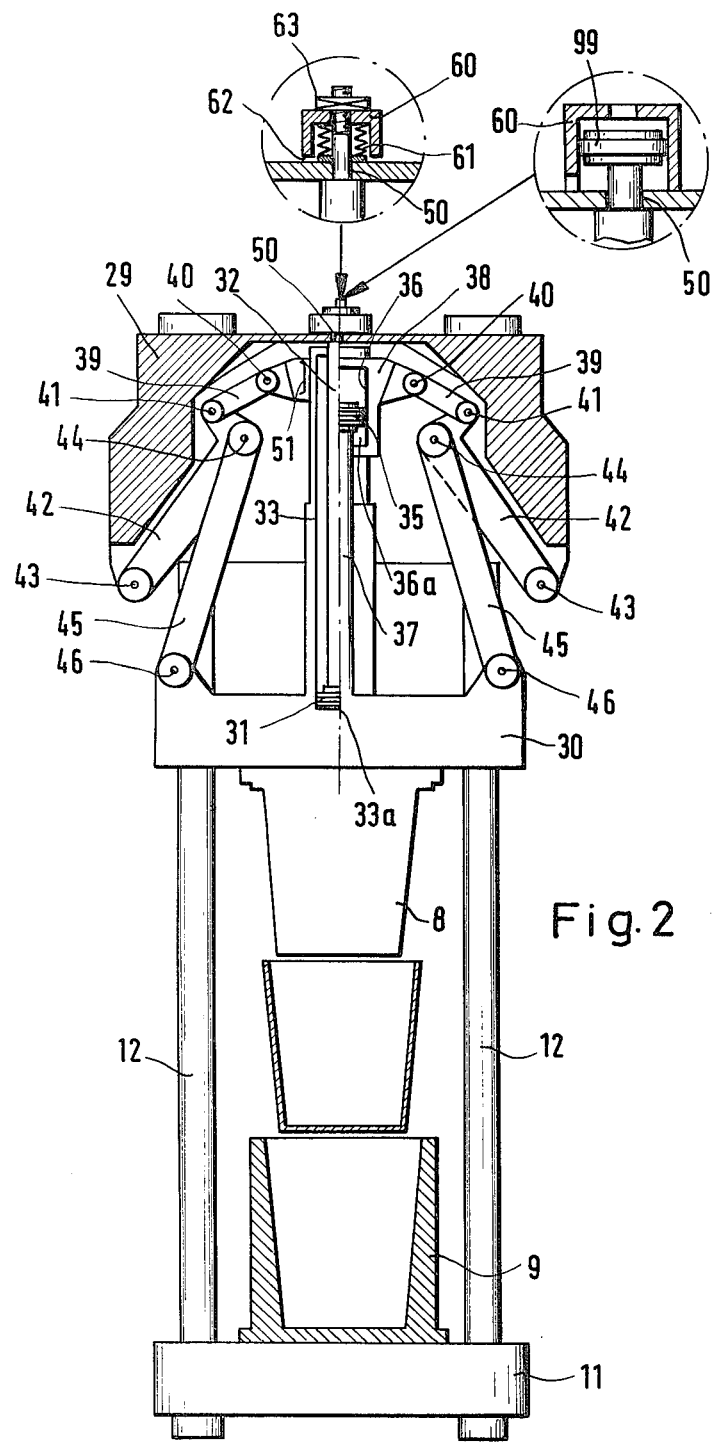
FIG. 2 is a schematic view of a press provided with the device according to the present invention in the open die position.
Figure 3:
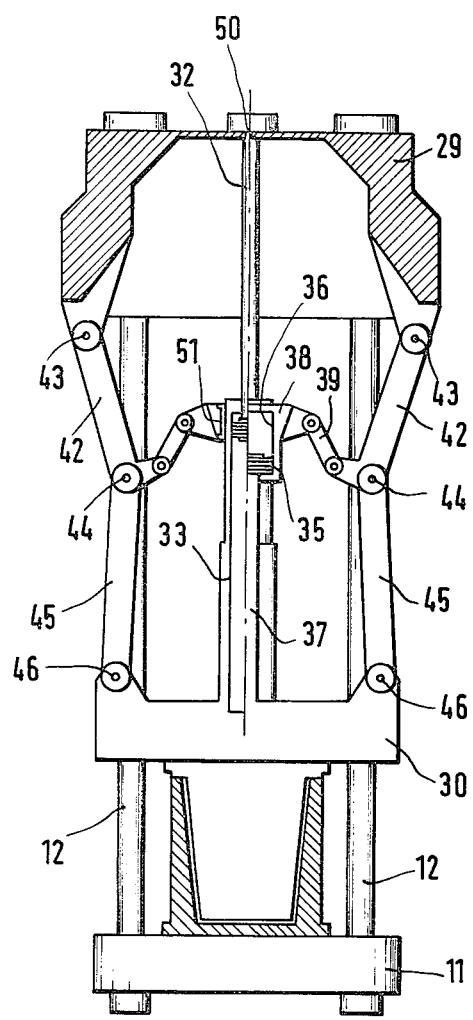
Figure 4:
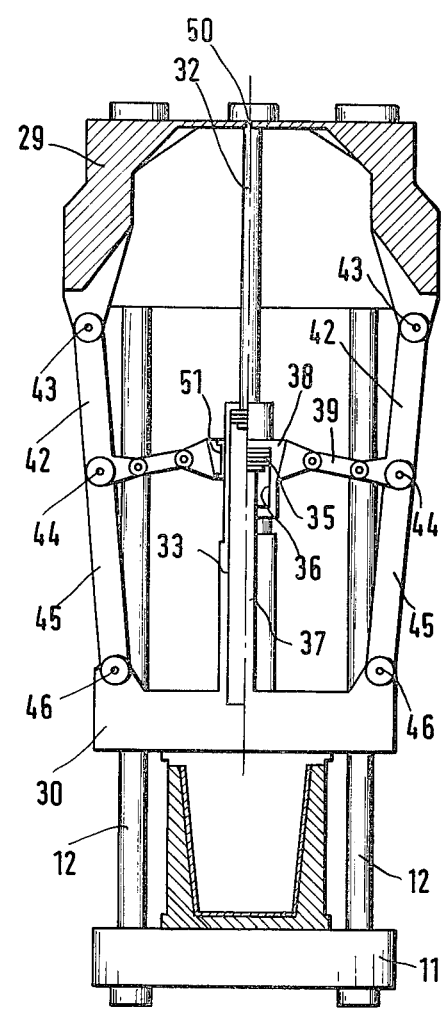

FIG. 3 similar to FIG. 2, illustrates the same press with the device in the closed die position before the actuation of the locking members;

FIG. 4 shows the press of FIGS. 2 and 3 with the device in the closed die position and the locking members in the active position;

FIG. 5 is a plan view of the device.

In the drawings, only the members functionally relevant to the present invention have been shown, and for the sake of clarity, all the other known elements, which are commonly part of the machine (as the injection system, the hydraulic central, and others) have been omitted.

Figure 1:
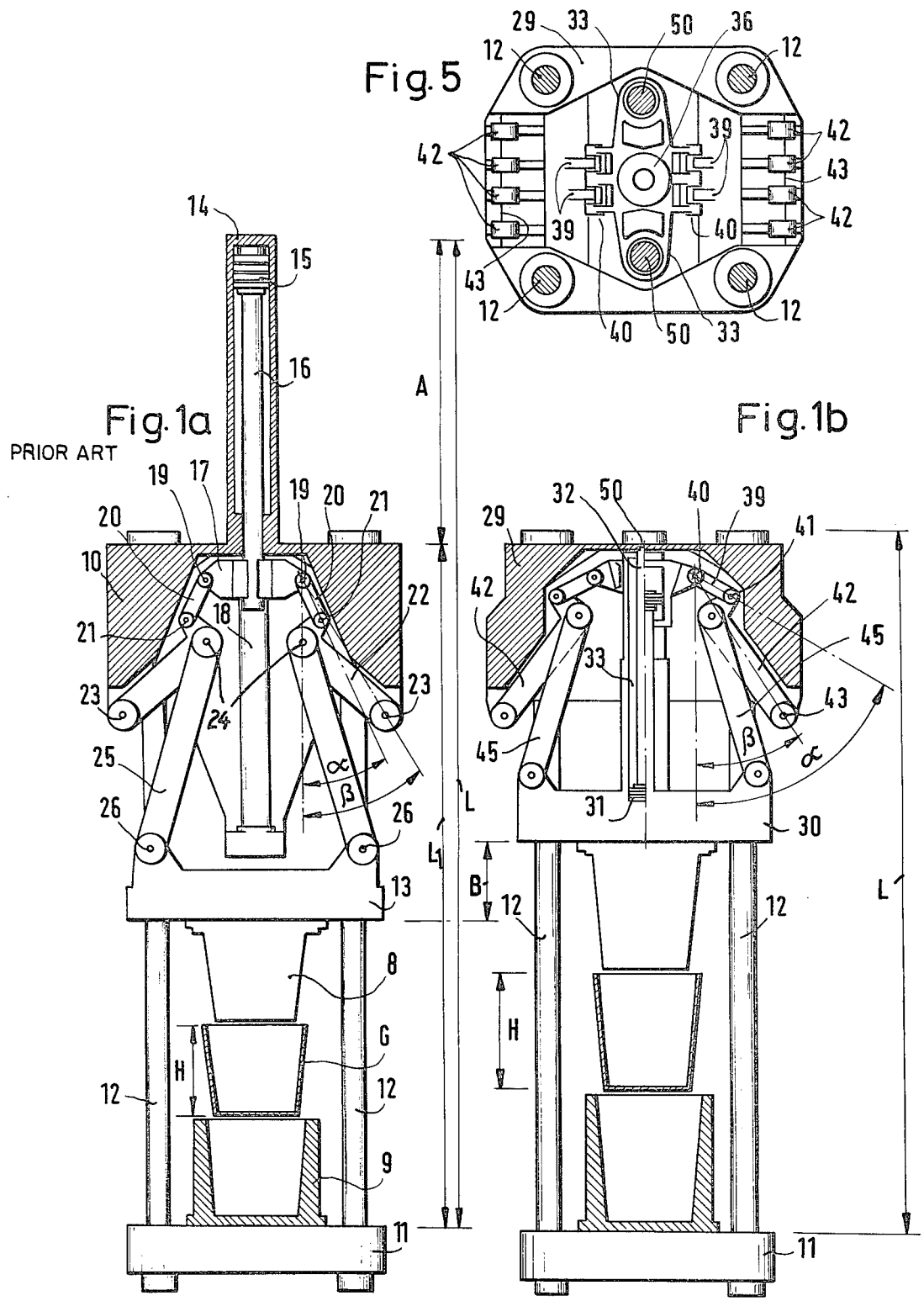
FIGS. 1a and 1b illustrate, respectively, an example of a press provided with a toggle device of the traditional type and a press provided with the device according to the invention.

With reference to FIG. 1a, illustrating a press provided with a toggle action device of the known type, numeral 10 indicates the head or reaction plate of the machine, and numeral 11 is the stationary plate integrally carrying part 9 of the die (commonly called the matirix). Numeral 13 indicates the mobile plate carrying the other half 8 of the die, the mobile plate sliding on columns 12 rigidly connected between the head or reaction plate 10 and to the stationary plate 11.

The toggle device of the known type, which actuates the mobile plate 13, generally comprises: a double acting cylinder 14 rigidly connected to the head, or reaction plate, 10 of the machine, and accommodating a piston 15 connected to a rod 16. Rod 16 is connected to a crosshead 17 slideable on a stationary guide 18. The crosshead 17, by means of pins 19, is articulated to the connecting rods 20. Connecting rods 20 are articulated by means of pins 21 to levers 22 which are capable of rotating around pins 23 connected to the head, or reaction plate 10, of the machine. Levers 22 are articulated to connecting rods 25 by pins 24, and connecting rods 25 are pivoted at 26 to the mobile plate 13.

With this known toggle device, the closing movement, downwardly, of the mobile plate in FIG. 1a is obtained in the following way: fluid pressure applied to cylinder 14 causes the downward displacement of piston 15 and hence of rod 16 and crosshead 17. As a result, crosshead 17 acts on connecting rods 20 causing the rotation of levers 22 towards plate 11. Consequently, the connecting rods 25 push the mobile plate 13 towards the stationary plate 11.

The stroke of piston 15 continues until the toggle becomes completely extended, that is, until the pins 23 and 24, and 26 become aligned or very nearly so. In that position, the die is locked and the machine exerts the maximum gripping force.

The known type of toggle device which has been described lends itself to some considerations which permit individualizing the limits inherent in its principle of operation.

Since the movement of plate 13 is produced by the piston 15 and the crosshead 17 in both the approaching phase and the phase for locking of parts 8 and 9, the kinematic motion must be obtained in such a way that, at any point of its stroke, a thrust on the piston 15 transmits a suitable thrust to the mobile plate 13. The same must occur during the return stroke of the mobile late 13. In order to have such a condition at the beginning of the gripping movement, it is necessary for the angle $\alpha$, between an imaginary line joining the pins 19 and 21 and an imaginary line parallel to the direction of movement of mobile plate 13, to be smaller than the angle $\beta$, between the imaginary line parallel to the direction of movement of mobile plate 13 and an imaginary line joining pins 19 and 23. In effect, since the connecting rod 20 transmits the thrust of the crosshead 17 in the direction of the line passing through pins 19 and 21, the above stated condition is absolutely necessary to obtain a thrust on the crosshead 17 which causes the rotation of levers 22 around pins 23 towards plate 11.

The angular difference $\beta - \alpha$ may be called the thrust angle of the moving connecting rod 20. For the above-stated reasons, when the thrust angle is positive, the above-described operation of the device is possible; if the thrust angle of the moving connecting rod 20 would be negative, the operation of the toggle lever assembly would not be possible.

The necessity for having, in the known toggles a positive thrust angle, causes restrictions in the opening stroke of the mobile plate 13. ;p In effect, mobile plate 13 cannot open for the whole stroke which would be permitted in the kinematic motion, since that would imply reaching of negative thrust angles and therefore the impossible operation in the traditional manner. The maximum opening of the mobile plate 13 must therefore be limited to the position corresponding to a thrust angle which is positive and sufficiently wide as to assure the correct operation of the machine. This fact increases the cumbersomeness of the kinematic group because, as its stroke cannot be utilized fully, it must be made oversized since the lengths of levers 22 and connecting rods 25 are not fully utilized.

Furthermore, it is clear that in the known actuation device illustrated on FIG. 1a, the length of the connecting rod 25 is affected by the length of the stationary guide 18 of the crosshead. This constitutes a futher limitation of the stroke of the mobile plate 13.

Another significant drawback derives from the disadvantage of stationary cylinder 14 protruding longitudinally from the casing of the machine a substantial length ("A" in FIG. 1a), greater than the stroke of piston 15.

Another consideration in the known device illustrated in FIG. 1a derives from the fact that in many cases it is required, for presses provided with a toggle actuating device, that before locking, the die closing terminal phase takes place, for a very short distance, at a very reduced speed while applying the smallest force possible, in order to allow the intervention of possible security devices in case the terminal closing encounters any obstacle. The sensitivity of security devices, which are often prescribed by the accident prevention rules, is strictly connected, for obvious reasons, to the existence of the two conditions mentioned above. However, the known toggle device of FIG. 1a, while capable of providing the first condition (low speed in the final phase of the closing stroke) because the toggle is nearly fully extended, is not capable, just for this reason, of providing the second condition (a limited final closing force), except if the pressure acting on the cylinder 14 is reduced in a very expensive manner.

The toggle device according to the present invention, shown in FIGS. 2-4, eliminates the above-described drawbacks.

With reference to FIG. 2, which shows schematically a press provided with the improved device, numeral 19 indicates the head or reaction plate of the machine, made according to the known technical modalities and having dimensions and a shape suitable for receiving the device in the most convenient way, providing the most appropriate distribution of forces and elastic deformations in the closing phase. Numeral 11 indicates the stationary plate, rigidly connected to the head or reaction plate, on which the stationary part 9 of the die is suitably anchored. Numeral 30 indicates the mobile or moveable plate, carrying the mobile part 8 of the die, and sliding on columns 12 rigidly connected between the head or reaction plate 29 and to the stationary plate 11. Still with reference to said FIG. 2, the toggle device which is the subject matter of present invention is represented in the figure in the condition it assumes with the die being open. The toggle device includes the following parts:

a double acting approaching piston, or pistons, 31 connected to stems 32 which are connected in turn to the head or reaction plate 29 of the machine at the point of points 50;

an approaching cylinder, or cylinders, 33 rigidly connected to the mobile plate 30;

a locking double acting cylinder, or cylinders 36; rigidly connected to the crosshead 38, which is in turn connected to the coupling 51 axially slidable in guides formed in the cylinders 33 or in any way connected to the mobile plate 30, a locking system, formed by the connecting rods or third links 39, levers or first links 42, and connecting rods or second links 45, respectively, articulated as follows: the connecting rods 39 are articulated by pins 40 connected to the crosshead 38 and by pins 41 connected to levers 42; levers 42 are connected to the head or reaction plate of the machine by pins 43, and are connected to the connecting rods 45 by pins 44; the connecting rods 45 are connected to the mobile plate 30 by pins 46;

a double acting locking piston, or pistons, 35, rigidly connected to the mobile plate 30.

The illustrated system, as may be seen in the drawing, is provided with a single or double symmetry with respect to two longitudinal orthoganal planes passing through the machine.

As an example, according to FIG. 5 in a peferred, but not limiting, version of the device of the present invention, there may be two approaching cylinders 33 symmetrically located with respect to the single locking cylinder 36. There may be four connecting rods 39 and eight levers 42, all arranged with double symmetry with respect to the orthogonal longitudinal planes through the machine.

As may be seen in FIG. 2, and from the preceding description, the present toggle system comprises actuating cylinders with two different functions which act sequentially:

flow of pressure fluid into the mobile cylinders 33, wherein stationary pistons 31 are located, causes the mobile plate 30, as described in detail below, to approach the stationary plate 11 at an adjustable speed in the die closing phase; the cylinder 36 and the corresponding piston, are then actuated to obtain the locking of the closing die; in this second phase, the press exerts the maximum force and moves from the position shown in FIG. 3 to the position of FIG. 4, with the articulation axes 43, 44, 46 perfectly aligned for each of the toggles.

the use of the above-described double actuating system permits the presence of negative thrust angles in the opening of the die, by exploiting in a more complete manner the particular features of the kinematic group formed by parts 38, 39, 42 and 45. Thus, with these parts equal in size to those of the conventional system, it is possible to obtain a greater opening stroke, and conversely, for an equal opening stroke it is possible to reduce the dimensions of the parts and consequently of the machine.

Furthermore, with the system of this invention, it is possible to improve the technology for the compression molding of thermosetting and thermoplastic resins containing expanding agents, since the closing system according to the invention adds the advantages of the stiffness of the connecting rods to the particular features of the piston system which allows, if required, degassing of the plastic material being employed.

Moreover, the mobile cylinders 33 are placed inside the machine structure instead of protruding outside, as in the case of stationary cylinder 14, in FIG. 1a, of the traditional devices. With these considerations in mind, the advantages which may be obtained in a machine provided with a toggle device according to the invention, shown in FIG. 1b, with respect to a machine provided with a traditional toggle device, shown in FIG. 1a, may be seen by comparing the two figures.

Since numerals 8 and 9 indicate the two parts of a die suitable to reproduce the particular part G, the dimension "A" indicates the reduction of the dimensions of the closing kinematic group, and the dimension "B" is the greater stroke obtainable, deriving from the fact that the actuating cylinder is advantageously located inside the structure and the kinematic group is exploited more rationally.

In order to provide an indication of the reduction of the dimensions which may be obtained in a press according to the present invention, where H (FIGS. 1a and 1b) indicates the longitudinal maximum dimension of the part being molded, it may be seen that the total height L above the surface of the stationary plate 11 supporting the die, may assume the following values:

L = 11.2 H for a toggle press of the traditional type; and

L = 5.5 H for a press utilizing the device of this invention.

In a press of the traditional toggle type, the length L1 (shown in FIG. 1a) which refers to the machine height, excluding the actuating cylinder, is equal to: L1 = 7.65 H.

The reduction in dimensions of the closing kinematic group is obtained because, according to the invention and as distinguished from the traditional type toggles, the angle $\alpha$ between the imaginary line joining the articulation pins 40 and 41 of the levers 39 and the imaginary line parallel to the direction of movement of the mobile plate 30 may be larger than the angle $\beta$ between the imaginary line parallel to the direction of movement of mobile plate 30 and an imaginary line joining the articulation pins 40 and 43. The kinematic group stroke is therefore more fully exploited.

The operation of the device according to the invention will be now described. Obviously, in the FIG. 2 position of the kinematic group, a thrust acting downwardly on the crosshead 38 would not effect the closing of the die, because it would tend to rotate the lever 42 upwardly instead of downwardly, as viewed in the drawing. For this reason, the approach of the mobile plate 30 towards the stationary plate 11 during closing is obtained by means of cylinders 33 and pistons 31 instead of the toggle.

As previously stated, the approaching pistons 31, in contrast to the actuating pistons used in the known devices, are connected through stems 32 to the head or reaction plate 29 of the press at points 50. When the actuating fluid of the press is admitted into cylinder chamber 33 in zone 33a, cylinders 33 move towards the stationary plate 11 causing an approaching movement of the mobile plate 30 to which they are rigidly connected. The approach of the mobile plate 30 to the stationary plate 11 continues therefore due to the thrust of the fluid on the cylinders 33, until the two parts of the die come in contact and then it stops, because the pressure acting inside the cylinders 33 would not be sufficient to cause locking.

Of importance is the fact that with this type of construction, the approaching stroke of the mobile plate 30 may occur at the most suitable speed and pressure at any point, by adjusting the delivery and the pressure of the actuating fluid. In particular, in the final phase of the approaching stroke it is possible to control the approaching effort with a higher precision than that allowed by the known devices, so as to attain a greater sensitivity for the possible security devices present in the press.

During the described approaching phase, the levers of the toggle perform no active function, but they follow the mobile plate 30 in its motion. More precisely, in its closing movement, the mobile plate drags the connecting rods 45 which in turn rotate levers 42 toward the stationary plate 11, the levers 42 acting in turn through rods 39 on the crosshead 38.

The locking cylinder 36, which at that moment is inactive, is rigidly connected to the crosshead 38. The piston 35 integral with stem 37 may slide within the locking cylinder 36. Stem 37 is integral with the mobile plate 30.

During the approaching motion, the crosshead 38 is dragged by the levers of the toggle as previously described. The congruence of the motion is assured by the overstroke 36a of the cylinder 36.

In FIG. 3, a press provided with a device according to the invention, is shown in the condition it assumes at the end of the approaching stroke of the mobile plate 30 towards the stationary plate 11, but before locking occurs by extension of the toggle. In this condition, the piston 35 is still in its initial position towards the low part of the cylinder 36. At that moment, the extension of the toggle may begin. The actuating fluid pressure is admitted to the low part of the cylinder 36. The cylinder 36 is thereby moved downwardly and acts in the same direction on the crosshead 38.

The crosshead 38, by sliding through suitable couplings 51 on the external surfaces of the cylinders 33, or on any other surface integral with the mobile plate 30, extends the toggle by means of the connecting rods 39, thereby driving into alignment the pins 43, 44 and 46 by which the levers 42 and the connecting rods 45 are articulated. In this way, the locking of the press occurs with its maximum nominal force, as shown in FIG. 4.

At that moment, according to an optional variant of the device of the invention, the degassing phase, which has been previously mentioned, may be effected. The device allowing the effectuation of this phase consists of a variant of the system for anchoring of stems 32 to the head or reaction plate 29 at points 50, which is illustrated in the detail of FIG. 2. According to this variant, stems 32, instead of being rigidly anchored to the reaction plate, are connected to that plate so as to permit a small axial sliding at points 50. The sliding is adjusted by means of caps 60 and springs 61 whose preloading is adjusted by means of nuts 63, or other equivalent expedients. The movement of stems 32 and caps 60 is transmitted to a valve regulating the delivery of the actuating fluid (not shown in the figure) and calibrated so that the flow may be progressively reduced up to total cut-off when the caps move towards the reaction plate 29. The springs 61 are calibrated to a predetermined and adjustable value of the arrow and the preload.

The elastic system may be provided by a single action hydraulic piston 99 (FIG. 2) kept under pressure in the working direction by a hydropneumatic accumulator or even by the pump pressure, so that the preloading value is kept nearly constant.

After the first locking of the die and the subsequent injection of the thermosetting or thermoplastic resins containing expanding agents, the toggle is locked and the actuating fluid is admitted into the acting chamber of the approaching cylinders 33 and controlled by the above-mentioned valve, at a pressure of a predetermined and adjustable value, such as to compress the springs 61 without exceeding the value which brings them to compaction. This causes a temporary and minimum opening of the mobile plate 30 regulated by the system through the said valve, which allows the degassing of the die; subsequently, the toggle is again locked at closure for the termination of the pressing cycle.

When the die is open, the movements occur in the reverse order. At the beginning, FIG. 4, the fluid pressure will be introduced into the upper side of the cylinder 36; the crosshead 38 will therefore move upwardly (referring to the drawing) and unlock the toggle, FIG. 3. Subsequently, the operating fluid will be introduced into the upper side of the cylinders 33 which, by moving back, will drag with it (upwardly referring to the drawing) the mobile plate 30, to the opening position indicated in FIG. 2. The opening may be protracted until even important negative values of the thrust angle, as previously defined, are attained.

Due to the invention which has been described, the operation of the press is more regular and controlled, and allows the degassing and decompression operations required for some articles manufactured with some thermosetting or thermoplastic resins, and at the same time the cumbersomeness of the device is substantially reduced for the above stated reasons.

From the preceding specification and the schematic drawings, it may be seen that the device illustrated may advantageously be utilized on presses whose actuation is pneumatic, hydropneumatic, hydraulic, and oleodynamic, and of the horizontal, vertical, or inclined type, to be used singly or associated with other stationary or mobile operating units.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A press comprising:
   (a) a stationary plate,
   (b) a reaction plate spaced a fixed distance from the stationary plate,
   (c) a moveable plate between the stationary and reaction plates and moveable toward and away from the stationary plate,
   (d) a toggle mechanism pivotally mounted between the reaction plate and moveable plate,
   (e) a first piston-cylinder device for moving the moveable plate between a position relatively far from the stationary plate to a position relatively close to the stationary plate, and
   (f) a second piston-cylinder device, operable independently of the first piston-cylinder device, for activating the toggle mechanism to lock the moveable and stationary plates together,
   (g) both of the piston-cylinder devices and the toggle mechanism being located in their entireties between the reaction plate and the moveable plate when the moveable plate is in its closest location to the stationary plate,
   (h) the toggle mechanism including a first link pivoted to the reaction plate, a second link pivoted to the moveable plate, the two links being pivoted to each other at their free ends, a crosshead moveable by the piston-cylinder devices, and a third link pivoted between the crosshead and at least one of the first and second links, and
   (i) when the moveable plate is at its farthest location from the stationary plate, the angle between the direction of movement of the moveable plate and the third link is greater than the angle between the direction of movement of the moveable plate and a line drawn between the pivot point of the third link to the crosshead and the pivot point of the first link to the reaction plate.

2. A press as defined in claim 1 wherein the pivoted-together free ends of the first and second links are spaced farther from the moveable plate than the remainder of either of these links when the moveable plate is at its farthest location from the stationary plate.

3. A press as defined in claim 1 wherein the first piston-cyliner device is moveably coupled to the reaction plate, and including means moveable by that piston-cylinder device with respect to the reaction plate for controlling the operation of the first piston-cylinder device during its final movement of the moveable plate toward the stationary plate.

* * * * *